United States Patent [19]

Hird

[11] 3,788,661

[45] Jan. 29, 1974

[54] STEERABLE TOBOGGAN

[76] Inventor: Cletus V. Hird, 595 North Chestnut St., Platteville, Wis. 53818

[22] Filed: June 5, 1972

[21] Appl. No.: 259,810

[52] U.S. Cl. .................................................. 280/22
[51] Int. Cl. .............................................. B62b 13/08
[58] Field of Search ....................... 280/22, 21 R, 18

[56] References Cited

UNITED STATES PATENTS

| | | | |
|---|---|---|---|
| 3,034,799 | 5/1962 | Conover | 280/22 |
| 1,353,817 | 9/1920 | Ashby | 280/21 R |
| 2,766,992 | 10/1956 | Rohe | 280/22 |
| 3,684,306 | 8/1972 | Rathmann | 280/22 |

*Primary Examiner*—Robert R. Song
*Attorney, Agent, or Firm*—Andrew F. Wintercorn

[57] ABSTRACT

This improved toboggan has a pair of fixed parallel rear runners and aligned therewith another pair of pivoted front runners, which are pivoted ahead of the mid-point so as to automatically return to straight ahead position after a turn, the steerable front runners having a spacer bar pivotally connected at opposite ends to their up-turned front ends and reciprocable in either of three ways: (1) by link connection with a crank on the forward end of a rotatable steering rod that is turnable with a steering wheel operated by the driver; (2) by oscillation of a foot operable steering bar having a pin and slot sliding pivotal connection with the spacer bar, or (3) by ropes attached to the opposite ends of the spacer bar. The runners project downwardly to a small extent from the flat bottom of the toboggan-like body and the steering means of all three kinds is easily operable by the driver seated on the bottom in the same way as riding the ordinary toboggan, the object being to maintain a low center of gravity and thus make for safety of operation even when negotiating fairly steep side hills.

4 Claims, 7 Drawing Figures

PATENTED JAN 29 1974 3,788,661
SHEET 1 OF 2
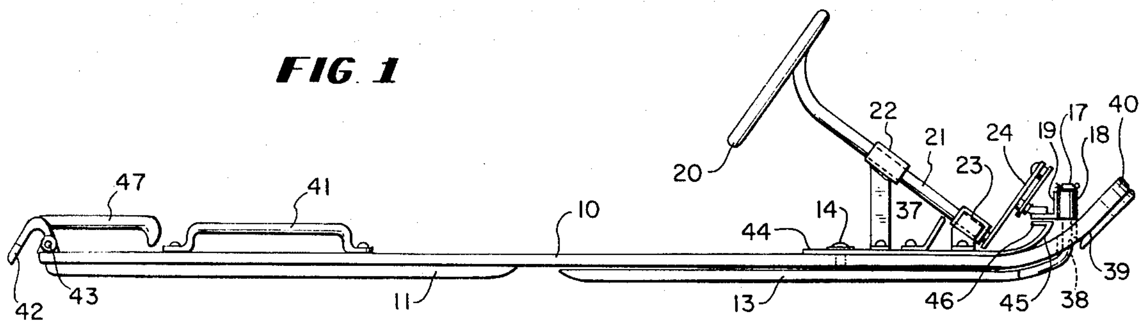
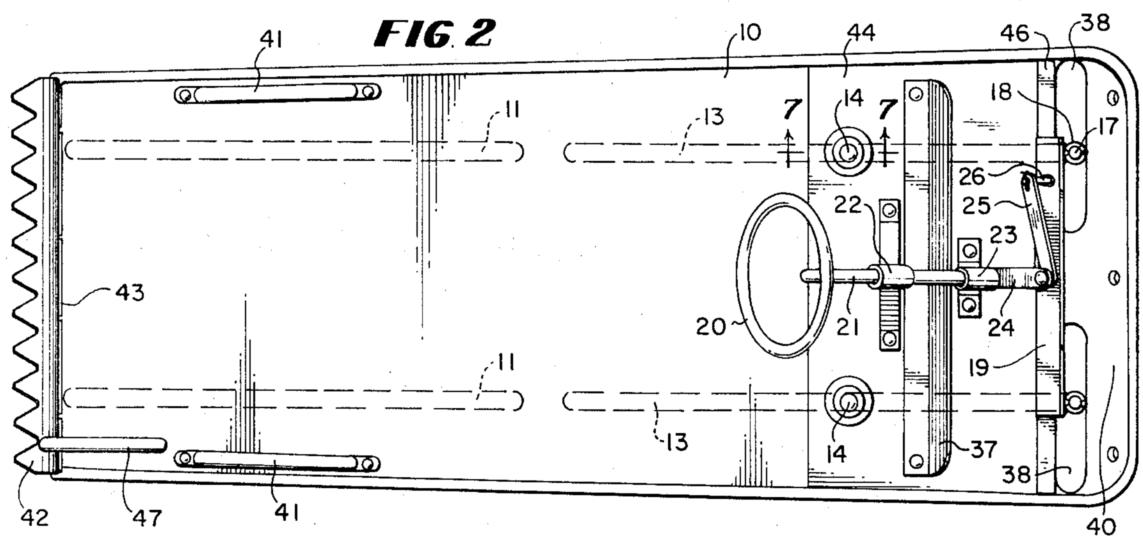
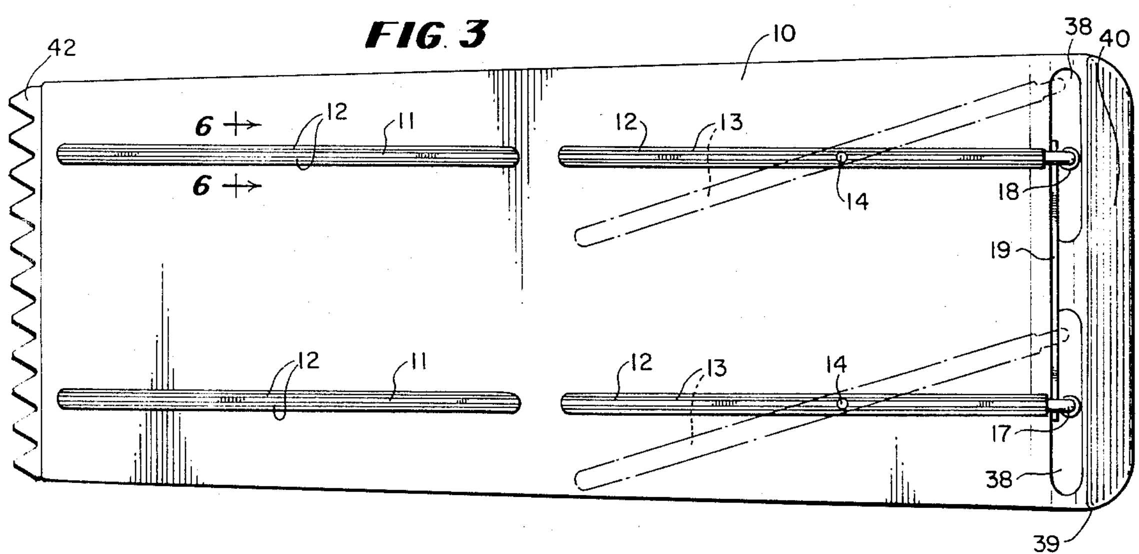

STEERABLE TOBOGGAN

This invention relates to a steerable toboggan designed to travel anywhere that a sled or toboggan can safely travel, due principally to its low center of gravity.

One of the principal objects of the invention is to provide an improved toboggan designed having elongated stationary parallel rear runners designed to prevent fish-tailing, and aligned front steerable runners that are pivoted relative to the bottom of the toboggan ahead of their mid-points to make for better steering and good self-aligning action after a turn is completed, all four runners projecting only slightly below the plane of the bottom of the toboggan just enough to perform their intended function and maintain a low center of gravity and give easy handling, either with a steering wheel connected through a steering rod to a crank that is connected by means of a link with a spacer bar pivoted at opposite ends to the up-turned ends of the steerable two front runners, or by means of ropes connected directly to the opposite end of the spacer bar, or by foot pressure against opposite ends of a raised steering bar, having a pin and slot sliding pivotal connection with the previously mentioned spacer bar.

The invention is illustrated in the accompanying drawings, in which:

FIG. 1 is a side view of a steerable toboggan embodying the improvements of my invention;

FIG. 2 is a plan view of FIG. 1;

FIG. 3 is a bottom view;

Figure 4:
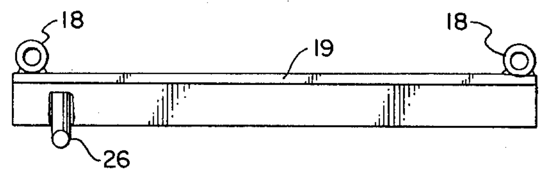
FIG. 4 is an isolated plan view of the angle-iron spacer bar with its bearings at opposite ends for pivotal connection with the up-turned vertical front ends of the steerable front runners.
Figure 5:
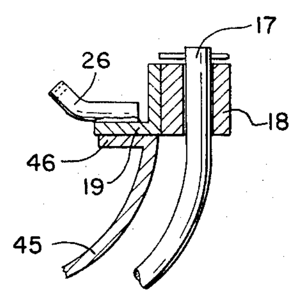
FIG. 5 is a sectional detail illustrating one of these pivotal connections.

FIGS. 8 and 9 are a plan view and a side view, respectively, of the front end portion of a toboggan showing a foot-operated steering bar oscillatable relative to the toboggan and disposed in slightly elevated relationship thereto and having a pin and slot slidable pivotal connection with the spacer bar attached to the steerable front ends of the pivoted front runners, and FIGS. 10 and 11 are a plan view and a side view, respectively, of the front end portion of a toboggan showing rope operation of the steerable front runners.

The same reference numerals are applied to corresponding parts throughout the views.

Figure 6:
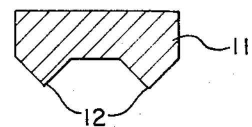
FIG. 6 is a sectional detail on line 6—6 of FIG. 3 of one of the runners showing the same substantially full size.
Figure 7:
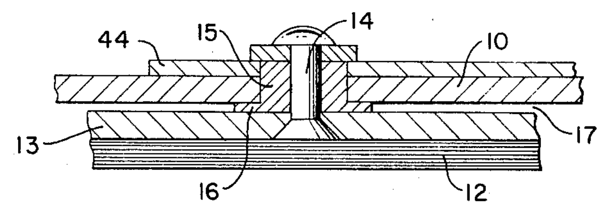
FIG. 7 is a sectional detail on the line 7—7 of FIG. 2 showing how the front runners are slightly spaced relative to the bottom of the toboggan while pivotally mounted thereon.

Referring first to FIGS. 1 to 7, the reference numeral 10 designates a toboggan-like body of any suitable length and width to the underside of which are secured in any suitable manner a pair of parallel metallic runners 11 in fixed relation to the rear half of the body 10 and molded to the shape shown in FIG. 6 so as to provide parallel downwardly embossed straight edges 12 for low friction running of the toboggan on ice and snow, with enough impression into the surface travelled upon to prevent "fish-tailing." These runners 11 are about equal in length to the rear half of the body 10. A pair of parallel steerable front runners of approximately equal length to the rear runners 11 and of similar construction, as seen in FIG. 7, namely, with parallel embossed straight edges 12, are pivoted on vertical axes, as shown in FIG. 7, forwardly relative to the mid-points of these runners to the extent clearly shown in FIGS. 1 to 3 with a view to easier steering and also good self-aligning action promptly after a turn has been negotiated and the toboggan is to travel straight forward again. To insure easier steering despite the closeness of these runners 13 to the flat bottom of the body 10, each bushing 15 forming the bearing for the rivet 14 has a thin annular flange 16 spacing the runner 13 relative to the bottom of the body 10, as indicated at 17 in FIG. 7. Welded or otherwise rigidly secured to the front ends of the runners 13 are upwardly bent steering arms 17, the vertical cylindrical end portions of which are pivotally received in vertical bearings 18 welded or otherwise rigidly secured to the opposite ends of an angle-iron spacer bar 19 that is reciprocable transversely of the front end of the toboggan 10 in either of three ways:

1. by turning a steering wheel 20 provided in fixed relation to the upper end of an inclined steering rod 21 received in spaced bearings 22 and 23 rigidly mounted on the toboggan 10 as shown, the lower end of the rod 21 having welded or otherwise rigidly secured thereto a crank arm 24 pivotally connected by means of a link 25 to a cross-pin 26 that is welded or otherwise suitably secured to the steering bar 19 near one end thereof, as best appears in FIG. 2;
2. a steering bar 27 horizontally disposed over the front end portion of toboggan 10 and pivoted on a bracket 28 fixed to the toboggan is oscillatable relative to a vertical pivot 29 on the bracket 28 and has a forwardly extending arm 30 with a slot 31 provided therein, in which a vertical pin 32 carried on a rearwardly projecting lug 33 provided on the middle portion of the angle-iron spacer bar 19 is slidably pivoted as should be clear from FIGS. 8 and 9, and
3. the simplest and most economical means of reciprocating the spacer bar 19 is by means of ropes 34 secured to the opposite ends of the spacer bar 19, as shown at 35, and extended laterally through guide means 36 on opposite sides of the front end portion of the toboggan so as to be pulled by the individual seated on the front end of the toboggan, with his feet bearing against a foot rest 37, the latter being similar to that shown at 37 also in FIGS. 1 and 2.

The operation of the steerable toboggan should be clear from the foregoing description. The transversely extending slots 38 in the front end portion of the toboggan are wide enough to provide ample operating clearance for the upwardly extending steering arms 17 with either of the three steering means employed, and a baffle plate or plates 39 of equal or greater length to the slots 38 are provided in connection with the slots on the under side of the upwardly curved front end portion 40 of the toboggan, thus preventing entry of any snow in the forward travel of the toboggan, while also serving to conceal and shield the operating arms 17 so they can't be fouled up by anything over which the toboggan travels. For these reasons these plates 39 should be of fairly heavy gauge and durable.

The usual handles, as shown at 41 in FIGS. 1 and 2, or the equivalent ropes to take hold of in riding the toboggan, are generally provided, and also a braking blade 42 pivoted, as at 43, transversely relative to the rear end of the toboggan and operable by one or more levers 47 so as to enable a fairly quick stop in any emergency, especially needed where the toboggan is being towed by a snowmobile or automobile.

A curved plate 44 extends transversely of and reinforces the front end of toboggan 10 and is suitably rigidly secured in place, as by rivets 14. The upwardly curved front end portion 45 of this plate has a horizontal rearwardly extending reinforcing flange 46 on which the spacer bar 18 rests for support in its reciprocatory movement. Plate 44 cooperates with baffles 39 to prevent snow entering the toboggan through slots 38.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a modified toboggan the elongated generally rectangular body of which has an upwardly curved front end portion and a substantially flat bottom surface and a flat top surface for riders, a pair of elongated parallel rear runners in fixed relation to and projecting downwardly only slightly from the bottom of said body on the rear substantially half portion, a pair of front oscillatable runners in parallel relation aligned with the rear runners and pivoted on vertical axes relative to the bottom of said body forwardly relative to the midpoints of said runners and also projecting downwardly only slightly from the bottom of said body, whereby to make for a low center of gravity, substantially as low as with the conventional toboggan, the front end portion of said toboggan body having transversely extending slots provided therein adjacent the front end of the front runners, the latter having upwardly extending steering arms projecting through said slots, a spacer bar extending transversely relative to the front end position of said body pivotally connected at opposite ends with said upwardly extending steering arms, and means for manually reciprocating said spacer bar, the last mentioned means comprising a steering rod supported for rotation in an inclined relationship to the front end portion of the toboggan body and having a manually operable steering member on its upper end and a crank arm fixed to its lower end and serving to reciprocate the spacer bar by means of a link pivotally connected at one end to the crank arm and at the other arm to the spacer bar.

2. In a modified toboggan the elongated generally rectuangular body of which has an upwardly curved front end portion and a substantially flat bottom surface and a flat top surface for riders, a pair of elongated parallel rear runners in fixed relation to and projecting downwardly only slightly from the bottom of said body on the rear substantially half portion, a pair of front oscillatable runners in parallel relation aligned with the rear runners and pivoted on vertical axes relative to the bottom of said body forwardly relative to the midpoints of said runners and also projecting downwardly only slightly from the bottom of said body, whereby to make for a low center of gravity, substantially as low as with the conventional toboggan, the front end portion of said toboggan body having transversely extending slots provided therein adjacent the front end of the front runners, the latter having upwardly extending steering arms projecting through said slots, a spacer bar extending transversely relative to the front end position of said body pivotally connected at opposite ends with said upwardly extending steering arms, and means for manually reciprocating said spacer bar, the last mentioned means comprising a steering rod supported for rotation in an inclined relationship to the front end portion of the toboggan body and having a manually operable steering member on its upper end and a crank arm fixed to its lower end and serving to reciprocate the spacer bar by means of a link pivotally connected at one end to the crank arm and at the other arm to the spacer bar, and baffle plate means secured to the upwardly curved front end portion of said toboggan body and extending downwardly relative thereto in front of the transversely extending slots for prohibiting entry of snow or the like through the slots in the forward travel of the toboggan while also concealing from view from in front of the toboggan the steering arms and shielding the same against damage by contact with anything over which the toboggan rides.

3. The structure set forth in claim 2 including an upwardly directed baffle plate on the body of said toboggan behind the transversely extending slots to prevent passing of snow through the slots rearwardly in forward travel of the toboggan, said baffle plate having a substantially horizontal flange on its upper portion on which said spacer bar rests and is reciprocable.

4. The structure set forth in claim 2 including baffle plate means in front and behind said transverse slots in forward travel of the toboggan, one of said baffle plate means providing guiding support for the spreader bar in its reciprocation transversely relative to the toboggan.

* * * * *